United States Patent [19]

Cunningham et al.

[11] Patent Number: 4,572,544
[45] Date of Patent: Feb. 25, 1986

[54] ANCHORAGE MEANS FOR VEHICLE SAFETY BELTS

[75] Inventors: Douglas J. Cunningham, Lutterworth; Robert F. Else, Locks Heath; David A. Harries, Rustington, all of England

[73] Assignee: Britax (Wingard) Limited, England

[21] Appl. No.: 605,774

[22] Filed: May 1, 1984

[30] Foreign Application Priority Data

May 11, 1983 [GB] United Kingdom ............... 8313023

[51] Int. Cl.⁴ ............................................. B60R 22/00
[52] U.S. Cl. .................................................. 280/808
[58] Field of Search .......................... 280/801, 808; 248/297.2, 297.3, 243, 244, 246; 292/137

[56] References Cited

U.S. PATENT DOCUMENTS 4,453,741 6/1984 Hipp et al. ......................... 280/801

FOREIGN PATENT DOCUMENTS

| 086633 | 8/1983 | European Pat. Off. ............ 280/801 |
| 2947391 | 5/1981 | Fed. Rep. of Germany . |
| 2932505 | 2/1982 | Fed. Rep. of Germany . |
| 66049 | 4/1982 | Japan .................................. 280/801 |
| 1497397 | 1/1978 | United Kingdom ................ 280/808 |
| 2070414 | 9/1981 | United Kingdom . |
| 2081568 | 2/1982 | United Kingdom . |

Primary Examiner—Joseph F. Peters, Jr.
Assistant Examiner—Ross Weaver
Attorney, Agent, or Firm—Hayes, Davis & Soloway

[57] ABSTRACT

An adjustable shoulder anchorage assembly comprises a vertically extending track mounted on the interior of a vehicle body above the level of the shoulders of an occupant of an adjacent seat and a traveller mounted on the track and carrying a guide member having a slot for receiving the strap of a safety belt. An L-shaped latch member has an opening in one limb surrounding the pivotal mounting means and engaging with a shoulder thereon, the other limb projecting beyond the track and carrying a latching formation. Resilient means biases the first limb away from the track so as to move the latching formation into engagement with one of a series of complementary formations on the track so as to inhibit movement of the traveller along the track. Blocking means prevents movement of the latching formation out of engagement with the complementary formations. Manual release means operates first to inhibit the blocking means and then to disengage the latching formation from the complementary formations.

9 Claims, 6 Drawing Figures

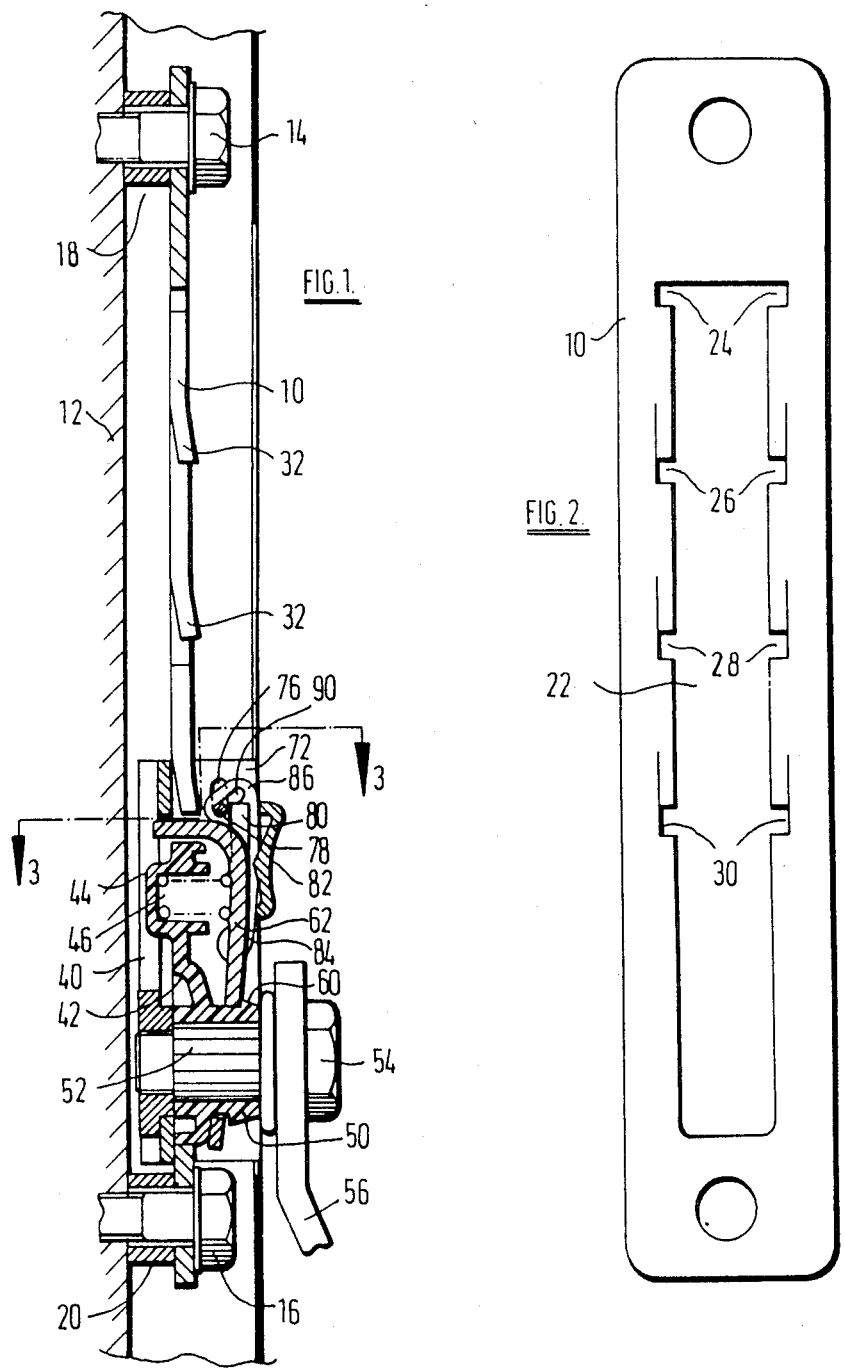

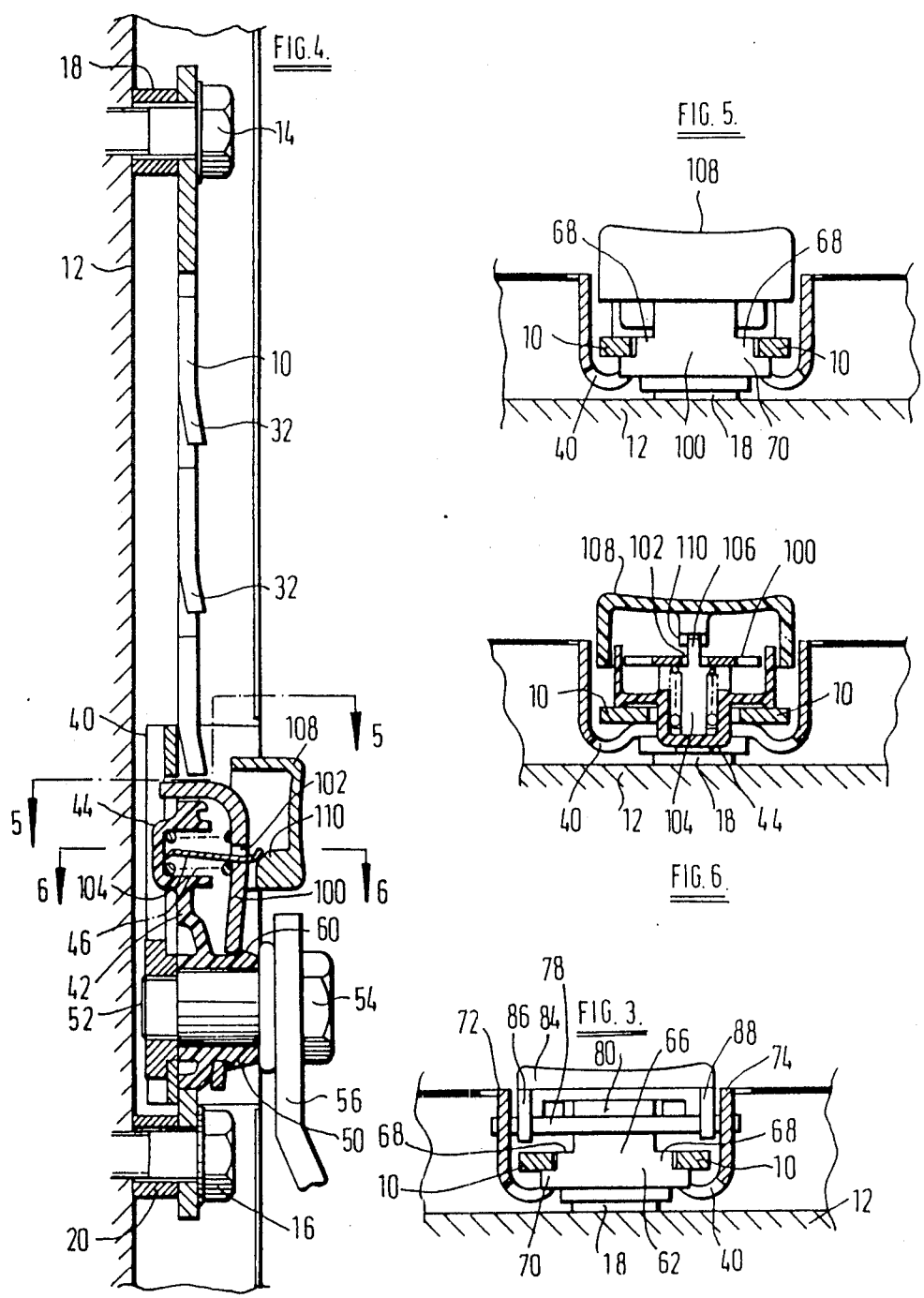

ANCHORAGE MEANS FOR VEHICLE SAFETY BELTS

This invention relates to anchorage means for vehicle safety belts and more particularly to anchorage means of the kind which are adapted to be mounted on a vehicle body above the shoulder level of the occupant of an adjacent seat for reception of the shoulder strap of the safety belt. Anchorage means of this kind are commonly referred to as pillar loops. The present invention is particularly concerned with the provision of a pillar loop of adjustable height.

DE-A-2947391 discloses an adjustable pillar loop assembly comprising a vertically extending track mounted on the interior of a vehicle body above the level of the shoulders of an occupant of an adjacent seat, a traveller mounted on the track, a latch member pivotally mounted on the traveller and carrying a latching formation for engagement with complementary formations on the track so as to inhibit movement of the traveller along the track, and a guide member having a slot for receiving the strap of a safety belt pivotally mounted on the latch member so that the guide member is angularly movable about a horizontal axis. The latching formation can be disengaged from the complementary formations on the track by pressing on the pivotal mounting means for the guide member. However, the total mass of the latch member, the guide member and the pivotal mounting of the latter is such that, in the event of the vehicle being subject to high lateral acceleration, for example as a result of impact during an accident, a substantial force tending to disengage the latching formation may be produced, with the result that the resilient biasing means has to be capable of exerting a substantially greater force. This means that considerable effort is required to disengage the latch so as to be able to adjust the height of the pillar loop.

According to the invention, an adjustable pillar loop assembly comprises a vertically extending track mounted on the interior of a vehicle body above the level of the shoulders of an occupant of an adjacent seat, a traveller mounted on the track, a guide member having a slot for receiving the strap of a safety belt, pivotal mounting means securing the guide member to the traveller so that the guide member is angularly movable about a horizontal axis, an L-shaped latch member having an opening in one limb surrounding the pivotal mounting means and engaging with a shoulder thereon, the other limb projecting beyond the track and carrying a latching formation, resilient means for biasing the first limb away from the track so as to move the latching formation into engagement with one of a series of complementary formations on the track so as to inhibit movement of the traveller along the track, blocking means for preventing movement of the latching formation out of engagement with the complementary formations and manual release means operative first to inhibit the blocking means and then to disengage the latching formation from the complementary formations.

The release means preferably comprises a pushpad which is resiliently biased away from the latch member in the same direction as the latch member is resiliently biased relative to the traveller and the pushpad carries a cam formation which disables the locking means when the pushpad is moved into abutment with the latch member. Further depression of the pushpad then causes a corresponding movement of the latch member resulting in disengagement of the latching formation from the complementary formations.

The blocking means may comprise a member movable longitudinally in guides on the traveller between a position in which it engages under a projection on the latch member and a position in which it is clear of such projection, the cam formation on the pushpad being adapted to displace such member to the latter position. Alternatively, the blocking means may comprise a resilient strut projecting from the traveller generally in the direction of movement of the latch member and the pushpad, into engagement with the cam formation on the latter, such strut having a shoulder which engages under a corresponding shoulder on the latch member.

Embodiments of the invention will now be described, by way of example, with reference to the accompanying drawings, in which:

FIG. 1 is a cross-sectional view of an adjustable pillar loop assembly in accordance with the invention, fitted to the B-post of a motor car;

FIG. 2 is an elevation of the track of the assembly shown in FIG. 1;

FIG. 3 is a cross-sectional view taken on the line 3—3 in FIG. 1;

FIG. 4 is a cross-sectional view, similar to FIG. 1, of an alternative pillar loop assembly in accordance with the invention;

FIG. 5 is a cross-sectional view taken on the line 5—5 in FIG. 4; and

FIG. 6 is a cross-sectional view taken on the line 6—6 in FIG. 4.

Referring to FIG. 1, the track 10 of an adjustable pillar loop assembly in accordance with the invention is mounted on the B-post 12 by two bolts 14 and 16 and spacers 18 and 20. As can be seen from FIG. 2, the track 10 has a central elongate slot 22 with four aligned pairs of notches 24, 26, 28 and 30 in its side edges. The pair of notches 24 is disposed at the top of the slot 22. The upper edges of the other three pairs of notches 26, 28 and 30 are pressed outwardly to form lead-in ramps 32 on the side of the track 10 facing the B-post 12.

A traveller for movement along the track 10 comprises a base member 40 and a plastics body 42. The body 42 has a pocket 44 which projects through a hole in the base member 40 and accommodates a compression spring 46, the purpose of which will be explained hereinafter. The body 42 also includes a boss 50 which surrounds a metal spacer 52 surrounding a bolt 54 which is screwed into the base plate 40 and by which the slotted member 56 for receiving the seat belt strap is pivotally secured to the traveller.

The boss 50 on the plastics body 42 has a shoulder 60 on its outer end. An L-shaped latch member 62 has the end of its longer limb widened to accommodate a hole which is snapped over the shoulder 60 prior to insertion of the spacer 52, after which the latch member 62 is held captive on the boss 50. The shorter limb of the latch member 62 projects through the slot 22 in the track 10 and into a slot in the base member 40 of the traveller. As can be seen from FIG. 3, the shorter limb 62 of the latch member 62 has a main portion 66 which is narrow enough to pass through the slot 22 at any position, a pair of shoulders 68 which can pass through the slot 22 only when in alignment with one of the pairs of notches 24, 26, 28 and 30, and an end portion 70 which is too wide to pass through the slot 22 even when in alignment with one of the pairs of notches but which is narrower than the length of the slot 64 in the base plate 40. The spring 46 engages with the latch member 62 so as to bias it in the clockwise direction (as viewed in FIG. 1) about the fulcrum provided by the shoulder 60, the end portion 70 engaging with the side of the track 10 nearer to the B-post 12 when the shoulders 68 are received in one of the pairs of notches 24, 26, 28 and 30.

The base member 40 has outwardly facing side limbs 72 and 74 which contain elongate holes 76 through which the ends of a transverse rod 68 project. The latch 66 has a projection 80 which engages in front of the rod 78 when the latter is at the lower end of the slot 76. A pushpad 82 is pivotally mounted at 84 on the latch member 62 and has two side flanges 86 and 88 each of which has an oblique slot 90 through which the rod 78 projects. The pushpad 82 is biased by a leaf spring (not shown) away from the latch member 66. This leaf spring is much weaker than the spring 46 which biases the latch member 62 away from the base member 40.

When the shoulders 68 are received in one of the pairs of notches 24, 26, 28 and 30, movement of the traveller along the track 10 is prevented. Engagement of the rod 78 under the projection 80 prevents movement of the latch member 62 to the disengaged position. If the pushpad 82 is depressed, it first moves relative to the latch member 62, the interaction of the slot 76 and 90 moving the rod 78 clear of the projection 80. Further depression of the pushpad 82 then moves the latch member 62 inwardly, disengaging the shoulders 68 from the track 10, thus allowing the traveller to move freely therealong. On release of the pushpad 82, the shoulders 68 snap into engagement with the pair of notches 24, 26, 28 and 30 with which they next come into alignment, the leading surfaces 32 facilitating this movement when the traveller is moving downwardly. The leaf spring (not shown) biasing the pushpad 82 away from the latch member 62 then pulls the rod 78 back under the projection 80.

FIGS. 4 to 6 illustrate an alternative embodiment of the invention which has a different blocking means from that illustrated in FIGS. 1 to 3. Many of the components of the assembly are identical with the corresponding components of the assembly illustrated in FIGS. 1 to 3. These identical components are denoted by the same reference numerals and will not be described in detail.

The latch member 100 illustrated in FIGS. 4 to 6 differs from the latch member 60 in that it does not have a projection 80. Instead, it has a T-shaped opening 102 aligned with the axis of the spring 46, the cross-bar of the T-shape extending transversely of the latch member 100 and the steam thereof projecting towards the boss 50. A resilient strut 104 extends through the centre of the spring 46. For most of its length, the width of the strut 104 is such that it can pass through the wider part of the opening 102 formed by the cross-bar of the T-shape but not through the narrower part formed by the stem thereof. However the strut 104 has a narrow end portion 106 which can pass through any part of the opening 102. The length of the broader part of the strut 104 is such that when the shoulders at the junction with the narrower part 106 engage with the edges of the narrower part of the opening 102, the latch member 100 is blocked from moving from its engage to its release position. The free end of the broader part of the strut 104 is secured to the bottom of the pocket 44 at such an angle that the resilience of the strut 104 biases its other end towards the narrower end of the opening 102, thereby maintaining the latch member 100 in its blocked condition.

The pushpad 82 of FIGS. 1 to 3 is replaced by a pushpad 108 having a cam formation 110 which engages with the free end of the narrower portion 106 of the strut 104 so that, on the one had the resilience of the strut 104 urges the pushpad 108 away from the latch member 100 and, on the other hand, when the pushpad 108 is depressed, the cam formation 110 displaces the strut 104 away from the narrow part of the opening 102, thereby unblocking the latch member 100. When the cam formation 110 bottoms on the latch member 100, further depression of the pushpad 108 disengages the latch member 100 so that the traveller 40 is free to slide along the track 10.

The embodiments of the invention illustrated in the drawings provide a pillar loop which can be located in four alternative positions. Obviously a larger or smaller number of alternative positions can be provided if required.

We claim:

1. An adjustable pillar loop assembly comprising a vertically extending track mounted on the interior of a vehicle body above the level of the shoulders of an occupant of an adjacent seat, a traveller mounted on the track, a guide member secured to the traveller and having a slot for receiving the strap of a safety belt, a latch member having a latching formation thereon, resilient means for biasing the latching formation into engagement with one of a series of complementary formations on the track so as to inhibit movement of the traveller along the track, blocking means for preventing movement of the latching formation out of engagement with the complementary formations and manual release means operative first to inhibit the blocking means and then to disengage the latching formation from the complementary formations.

2. An assembly according to claim 1, wherein the latch member is L-shaped and has an opening in one limb surrounding the pivotal mounting means and engaging with a shoulder thereon, the other limb projecting beyond the track and carrying the latching formation, and the resilient means being arranged to bias the first limb away from the track.

3. An assembly according to claim 2, wherein the release means comprises a pushpad which is resiliently biased away from the latch member in the same direction as the latch member is resiliently biased relative to the traveller and the pushpad carries a cam formation which disables the locking means when the the pushpad is moved into abutment with the latch member, further depression of the pushpad then causing a corresponding movement of the latch member which results in disengagement of the latching formation from the complementary formations.

4. An assembly according to claim 3, wherein the blocking means comprises a member movable longitudinally in guides on the traveller between a position in which it engages under a projection on the latch member and a position in which it is clear of such projection, the cam formation on the pushpad being adapted to displace such member to the latter position.

5. An assembly according to claim 3, wherein the blocking means comprises a resilient strut projecting from the traveller substantially in the direction of movement of the latch member and the pushpad, into engagement with the cam formation on the latter, such strut having a shoulder which engages under a corresponding shoulder on the latch member.

6. An adjustable pillar loop assembly comprising a vertically extending track mounted on the interior of a vehicle body above the level of the shoulders of an occupant of an adjacent seat, a traveller mounted on the track, a guide member having a slot for receiving the strap of a safety belt, pivotal mounting means securing the guide member to the traveller so that the guide member is angularly movable about a horizontal so that the guide member is angularly movable about a horizontal axis, an L-shaped latch member having an opening in one limb surrounding the pivotal mounting means and engaging with a shoulder thereon, the other limb projecting beyond the track and carrying a latching formation, resilient means for biasing the first limb away from the track so as to move the latching formation into engagement with one of a series of complementary formations on the track so as to inhibit movement of the traveller along the track, blocking means for preventing movement of the latching formation out of engagement with the complementary formations and manual release means operative first to inhibit the blocking means and then to disengage the latching formation from the complementary formations.

7. An assembly according to claim 6, wherein the release means comprises a pushpad which is resiliently biased away from the latch member in the same direction as the latch member is resiliently biased relative to the traveller and the pushpad carries a cam formation which disables the locking means when the the pushpad is moved into abutment with the latch member, further depression of the pushpad then causing a corresponding movement of the latch member which results in disengagement of the latching formation from the complementary formations.

8. An assembly according to claim 7, wherein the blocking means comprises a member movable longitudinally in guides on the traveller between a position in which it engages under a projection on the latch member and a position in which it is clear of such projection, the cam formation on the pushpad being adapted to displace such member to the latter position.

9. An assembly according to claim 7, wherein the blocking means comprises a resilient strut projecting from the traveller substantially in the direction of movement of the latch member and the pushpad, into engagement with the cam formation on the latter, such strut having a shoulder which engages under a corresponding shoulder on the latch member.

* * * * *